(12) United States Patent
Mihira (10) Patent No.: US 9,690,523 B2
(45) Date of Patent: Jun. 27, 2017

(54) INFORMATION PROCESSING APPARATUS AND METHOD OF CONTROLLING THE SAME, AND STORAGE MEDIUM

(71) Applicant: CANON KABUSHIKI KAISHA, Tokyo (JP)

(72) Inventor: Yoshiro Mihira, Toride (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/062,988

(22) Filed: Mar. 7, 2016

(65) Prior Publication Data

US 2016/0274835 A1    Sep. 22, 2016

(30) Foreign Application Priority Data

Mar. 19, 2015   (JP) .................................. 2015-056863

(51) Int. Cl.
*G06F 15/00*   (2006.01)
*G06F 3/12*    (2006.01)

(52) U.S. Cl.
CPC ............ *G06F 3/1226* (2013.01); *G06F 3/123* (2013.01); *G06F 3/1204* (2013.01); *G06F 3/1225* (2013.01); *G06F 3/1232* (2013.01); *G06F 3/1292* (2013.01)

(58) Field of Classification Search
USPC ................................................ 358/1.13–1.15
See application file for complete search history.

(56) References Cited

U.S. PATENT DOCUMENTS

| 6,965,958 | B1 | 11/2005 | Sugiyama |
| 9,098,219 | B2 | 8/2015 | Mihira |
| 9,304,721 | B2 | 4/2016 | Mihira |
| 2014/0355048 | A1* | 12/2014 | Kang .................... G06F 3/1292 358/1.15 |

FOREIGN PATENT DOCUMENTS

| EP | 2 811 720 A2 | 12/2014 |
| JP | 2001-125761 A | 5/2001 |
| WO | 2014/136429 A1 | 9/2014 |

OTHER PUBLICATIONS

European Search Report dated Jul. 28, 2016 in European Application No. 16000562.5.

* cited by examiner

*Primary Examiner* — Saeid Ebrahimi Dehkord
(74) *Attorney, Agent, or Firm* — Fitzpatrick, Cella, Harper & Scinto

(57) ABSTRACT

An information processing apparatus on which a print application is installable, and a method of controlling the same. A search for printers is performed, and if a printer selected by a user from among a plurality of printers found by the search does not correspond to a print application that has performed the search, a determination is made as to whether or not another print application corresponding to the printer selected by the user has been installed to the information processing apparatus. If it is determined that the other print application has not been installed to the information processing apparatus, the user is prompted to install the other print application to the information processing apparatus.

11 Claims, 8 Drawing Sheets

INFORMATION PROCESSING APPARATUS AND METHOD OF CONTROLLING THE SAME, AND STORAGE MEDIUM

BACKGROUND OF THE INVENTION

Field of the Invention

The present invention relates to an information processing apparatus, a method of controlling the same, and storage medium.

Description of the Related Art

Due to the improved performance of mobile terminals, users of mobile terminals wish to store various kinds of data in their mobile terminals, and to transmit the data to a printer to be printed. When printing is to be performed with a printer, a user of a mobile terminal performs a search for printers from the mobile terminal, selects a printer to be used for printing, transmits print data to the selected printer, and the printer prints the print data. For example, Japanese Patent Laid-Open No. 2001-125761 discloses such a method for performing a search for a printer, by which candidates for the printer to be used is automatically narrowed down based on print settings.

Various kinds of applications that are executable on a mobile terminal are open to the public, and printers that can be used with an application are only the printers that are registered in the application. Therefore, there is a problem in which the user cannot find printers that can be used for printing if the user selects another application. For example, assume a case where two kinds of printers, namely an electrophotographic printer and a dye sublimation printer, are included in a network, and mobile terminal applications that each use either one of these kinds of printers are provided. Here, it can be assumed that the user, who wishes to perform print processing with the electrophotographic printer, mistakenly selects a dye sublimation printer application instead of an electrophotographic printer application. In such a case, the user cannot find the electrophotographic printer by performing a search for the electrophotographic printer that the user wishes to use, from the mobile terminal. Thus, there is a problem in which the user becomes unable to perform print processing by using the mobile terminal.

SUMMARY OF THE INVENTION

An aspect of the present invention is to eliminate the above-mentioned problems that occur in conventional technology.

A feature of the present invention is to provide a technique by which, even if a print application that can use a printer selected by a user has not been installed, another print application that corresponds to the printer selected by the user can be installed and used with a simple operation.

The present invention in its first aspect provides a method of controlling an information processing apparatus being capable of installing a print application, the method comprising: a search step of searching for printers; a first determination step of, if a printer selected by a user from among a plurality of printers found in the search step does not correspond to a print application that has performed a search, determining whether or not another print application corresponding to the printer selected by the user has been installed to the information processing apparatus; and a control step of prompting the user to install the other print application to the information processing apparatus if it is determined in the first determination step that the other print application has not been installed to the information processing apparatus.

The present invention in its second aspect provides an information processing apparatus being capable of installing a print application, the apparatus comprising: a search unit configured to search for printers; a first determination unit configured to, if a printer selected by a user from among a plurality of printers found by the search unit does not correspond to a print application that has performed a search, determine whether or not another print application corresponding to the printer selected by the user has been installed to the information processing apparatus; and a control unit configured to prompt the user to install the other print application to the information processing apparatus if the first determination unit determines that the other print application has not been installed to the information processing apparatus.

Further features of the present invention will become apparent from the following description of exemplary embodiments with reference to the attached drawings. Note that the same reference numerals denote the same or similar components throughout the accompanying drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
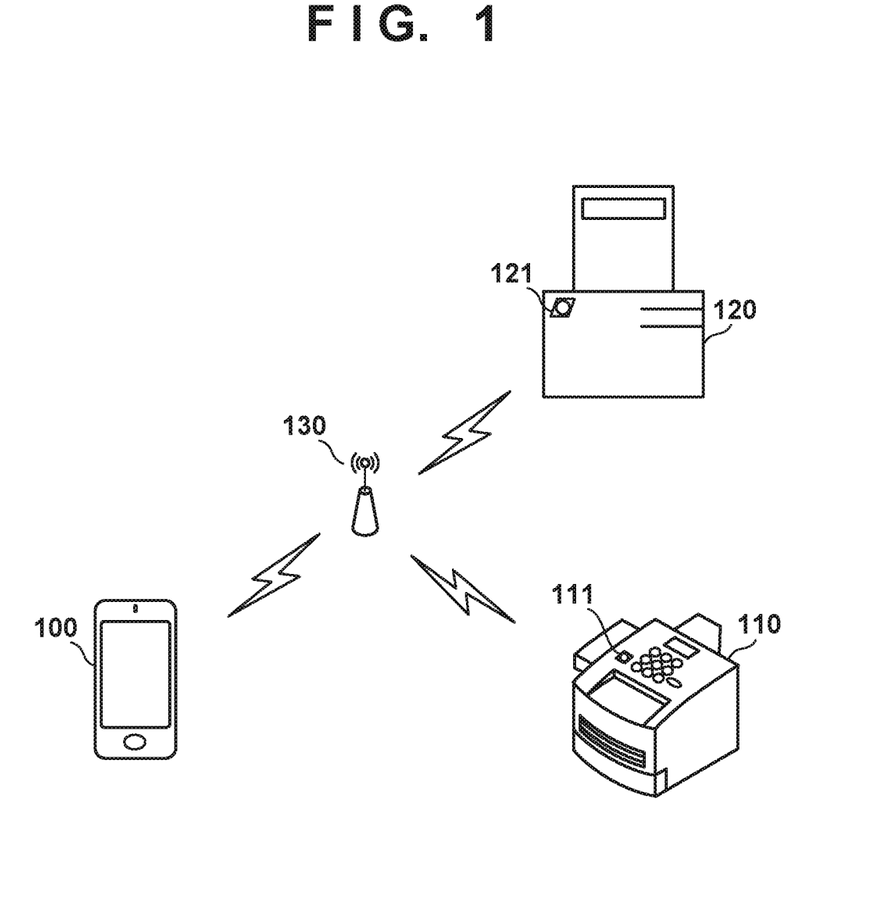
FIG. 1 is a diagram illustrating a configuration of a communication system according to a first embodiment of the present invention.

FIG. 1 is a diagram for describing a configuration of a communication system according to a first embodiment of the present invention.

The communication system according to the first embodiment includes a mobile terminal 100, an electrophotographic printer 110, a dye sublimation printer 120, and an access point 130. The printers respectively have NFC (Near Field Communication) tags 111 and 121.

The electrophotographic printer 110 and the dye sublimation printer 120 (hereinafter simply referred to as the printers 110 and 120 when both of these printers are mentioned) perform wireless communication such as Wi-Fi via the access point 130. Note that communication between the access point 130 and the printers 110 and 120 may be wired communication using a LAN cable or the like.

The mobile terminal 100 can communicate with printers via wireless communication such as Wi-Fi, and a print application can be installed therein. A user of the mobile terminal 100 inputs the SSID, the security key, or the like of the access point 130 to the mobile terminal 100, and thus the mobile terminal 100 is connected to the access point 130. The mobile terminal 100 can find the printers 110 and 120 and so on in the network by transmitting a search packet via wireless communication, and furthermore, the mobile terminal 100 can communicate with the printers 110 and 120 via the access point 130. That is, the mobile terminal 100 can transmit a print job to external apparatuses such as the printers 110 and 120 via the access point 130 by using a print application, and the printers 110 or 120 that has received the print job performs print processing according to the print job.

The mobile terminal 100 and the printers 110 and 120 can perform near field wireless communication such as NFC. In the first embodiment, the printers 110 and 120 respectively have the NFC tags 111 and 121. The NFC tag 111 stores therein information for connecting to the electrophotographic printer 110 (such as the IP address, the MAC address, and the model name of the electrophotographic printer 110). Similarly, the NFC tag 121 stores therein information for connecting to the dye sublimation printer 120 (such as the IP address, the MAC address, and the model name of the dye sublimation printer 120). The mobile terminal 100 can read and obtain the information stored in the NFC tags 111 and 121 by the method that will be described later with reference to a flowchart. The mobile terminal 100 can also connect to the access point 130 based on the information stored in the NFC tag 111 of the electrophotographic printer 110. Switching to wireless communication such as Wi-Fi using information obtained via near field wireless communication such as NFC is referred to as "handover". Due to handover, the user can be saved the trouble of inputting the information for connecting to the access point 130 (such as the SSID and the security key of the access point 130) to the mobile terminal 100. Note that the mobile terminal 100 can similarly perform handover by reading the information stored in the NFC tag 121 of the dye sublimation printer 120.

Figure 2:
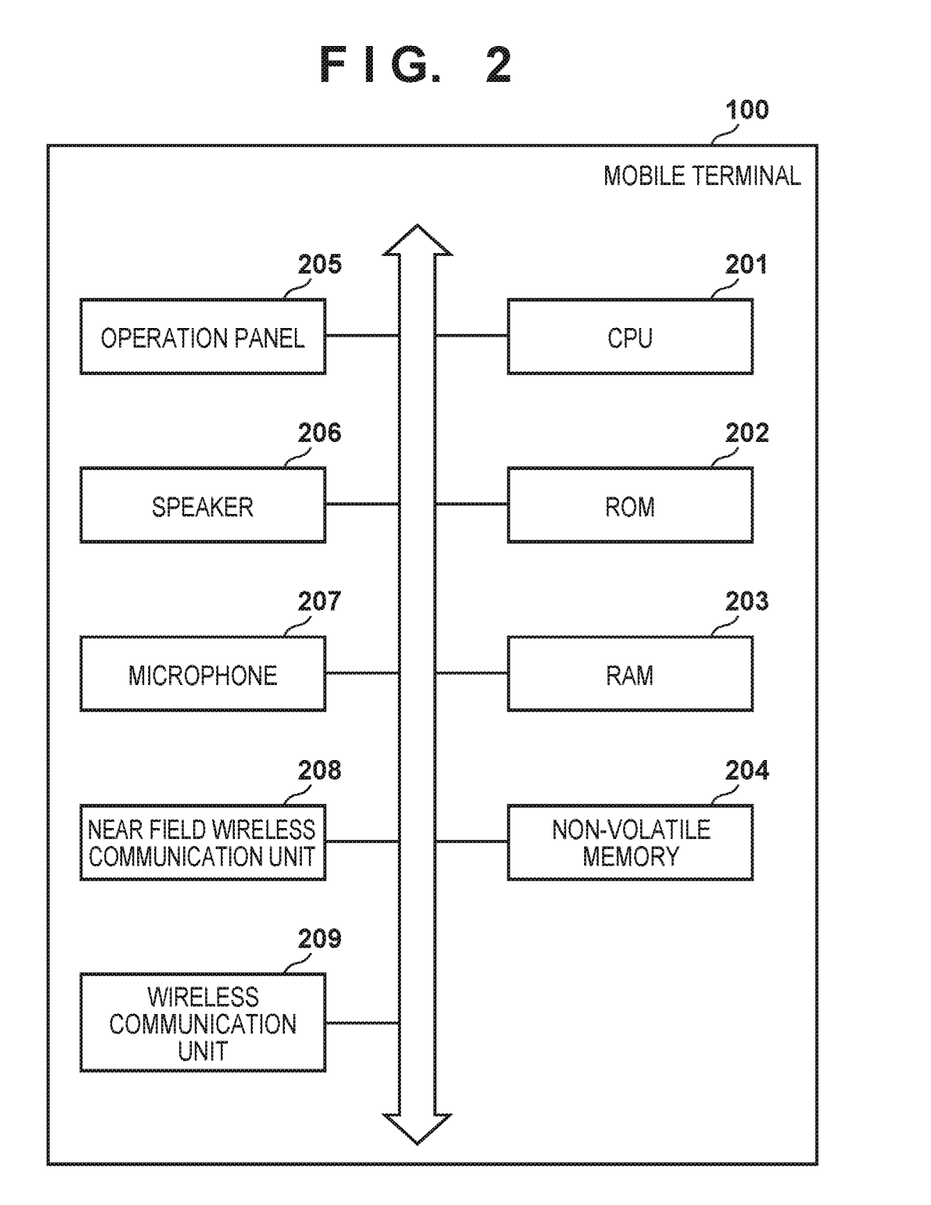
FIG. 2 is a block diagram for describing a hardware configuration of a mobile terminal according to the first embodiment.

FIG. 2 is a block diagram for describing a hardware configuration of the mobile terminal 100 according to the first embodiment. Note that although an apparatus such as a smart phone or a tablet PC is assumed as an example of the mobile terminal 100, another apparatus may be adopted only if the apparatus is an information processing apparatuses that can perform wireless communication.

Figure 3:
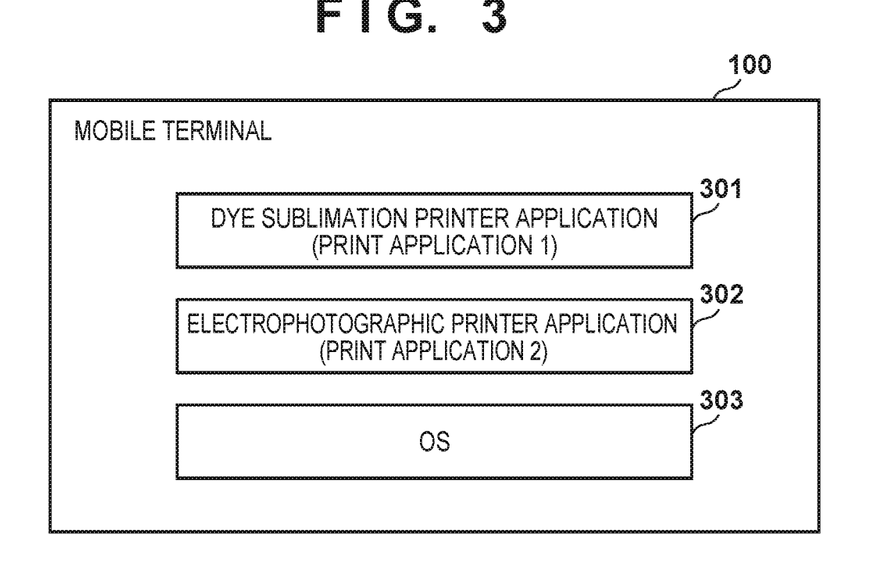
FIG. 3 is a functional block diagram for describing a software configuration of the mobile terminal according to the first embodiment.

A CPU 201 reads out a control program that is stored in a ROM 202, and performs various kinds of processing to control operations of the mobile terminal 100 in accordance with the control program. The ROM 202 stores therein the control program. A RAM 203 is used as a main memory and a temporary storage area such as a work area of the CPU 201. A non-volatile memory 204 stores therein various kinds of data such as pictures and electronic documents. An OS (operating system) 303, a dye sublimation printer application 301, and an electrophotographic printer application 302, which are shown in FIG. 3 and which will be described later, are also stored in the non-volatile memory 204.

In the mobile terminal 100 according to the first embodiment, a single CPU, namely the CPU 201, performs processing steps in the flowchart that will be described later. However, another mode may be adopted. For example, a configuration may be adopted in which a plurality of CPUs cooperate to perform processing steps in the flowchart that will be described later.

An operation panel 205 has a touch panel function, which is the function of detecting a touch operation made by the user. The operation panel 205 displays various kinds of screens that are provided by the OS 303 and applications. The user can input a desired operational instruction to the mobile terminal 100 by performing a touch operation on the operation panel 205. Note that the mobile terminal 100 is provided with hardware keys that are not shown in the drawings, and the user can input an operational instruction to the mobile terminal 100 by using the hardware keys. A speaker 206 and a microphone 207 are used when the user makes a phone call to another mobile terminal or a landline telephone.

A near field wireless communication unit 208 performs near field wireless communication such as NFC. In the first embodiment, the user moves the mobile terminal 100 closer to the NFC tag 111 of the electrophotographic printer 110, for example, and thus near field wireless communication is established between the near field wireless communication unit 208 and the NFC tag 111 of the electrophotographic printer 110. Consequently, the near field wireless communication unit 208 can obtain information registered in the NFC tag 111 via NFC. The same applies to the NFC tag 121 of the dye sublimation printer 120.

A wireless communication unit 209 performs wireless communication such as Wi-Fi. The mobile terminal 100 can search for the printers 110 and 120 with which communication is possible via the access point 130 by transmitting a search packet from the wireless communication unit 209. Also, using handover, the user of the mobile terminal 100 can realize wireless communication by the wireless communication unit 209 with a simple operation. Specifically, it is possible to connect the wireless communication unit 209 to the access point 130 by using the connection information (the SSID, the password, or the like of the access point 130) that has been obtained by the near field wireless communication unit 208 from the NFC tag 111 of the electrophotographic printer 110, for example. The same applies to the case where the NFC tag 121 of the dye sublimation printer 120 is used.

FIG. 3 is a functional block diagram for describing a software configuration of the mobile terminal 100 according to the first embodiment. Note that the functions shown in FIG. 3 are realized by the CPU 201 deploying a control program that is stored in the ROM 202, the non-volatile memory 204, or the like to the RAM 203, and executing the control program.

The OS 303 is an operating system, which is a basic program for executing applications on the mobile terminal 100. Various kinds of applications that can be executed on the OS 303, including two applications 301 and 302 which will be described later, can be installed to the mobile terminal 100. The OS 303 exchanges information with these applications, and, for example, changes the screen to be displayed on the operation panel 205, or performs wireless communication or the like with the wireless communication unit 209, according to an instruction received from the applications.

The dye sublimation printer application 301 (a print application 1) is an application that has been installed to the mobile terminal 100. The print application 1 is an application that searches for printers by using the wireless communication unit 209, connects to the dye sublimation printer 120 based on the information obtained from the NFC tag, and causes the dye sublimation printer 120 to perform print processing, for example. Here, the print instruction language that is transmitted by the print application 1 via the access point 130 is different from that for the electrophotographic printer 110. Therefore, from the print application 1, it is impossible to instruct the electrophotographic printer 110 to perform print processing. Therefore, if the mobile terminal 100 finds the electrophotographic printer 110 by a search for printers or NFC, the electrophotographic printer application 302 (a print application 2) is started up according to the processing shown in the flowchart that will be separately described.

The electrophotographic printer application 302 (the print application 2) is an application that has been installed to the mobile terminal 100. The print application 2, as with the print application 1, searches for printers by using the wireless communication unit 209. In addition, the print application 2 connects to the electrophotographic printer 110 by using the information for communicating with printers that is written in the NFC tag, and causes the electrophotographic printer 110 to perform print processing. Here, the print instruction language that is transmitted by the print application 2 via the access point 130 is different from that for the dye sublimation printer 120. Therefore, from the print application 2, it is impossible to instruct the dye sublimation printer 120 to perform print processing. Therefore, if the mobile terminal 100 finds the dye sublimation printer 120 by a search for printers or NFC, the aforementioned print application 1 is started up according to the processing shown in the flowchart that will be separately described. Although various kinds of applications are installed to the mobile terminal 100 in addition to the aforementioned two applications, a description there of is omitted.

Figure 4:
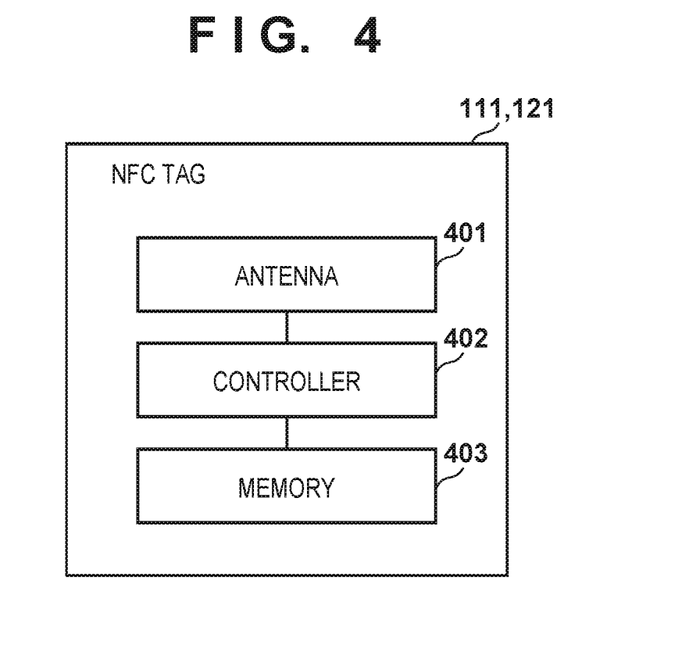
FIG. 4 is a block diagram for describing a hardware configuration of an NFC tag according to the first embodiment.

FIG. 4 is a block diagram for describing a hardware configuration of the NFC tags 111 and 121 according to the first embodiment.

An antenna 401 is connected to a controller 402. The antenna 401 is supplied with electric power from the near field wireless communication unit 208 of the mobile terminal 100 by means of electromagnetic induction. The electric power serves as operating power for the controller 402. The antenna 401 operates as an antenna for wireless communication from the near field wireless communication unit 208. The controller 402 communicates with the mobile terminal 100 via the antenna 401, and performs read/write processing from/to a memory 403 according to a read/write instruction obtained through the communication. As a result, the below-described information such as the IP address and the MAC address of the printer that is mounted with the NFC tag can be retained, and the information can be provided to the mobile terminal 100 via the antenna 401 as needed.

Figure 5:
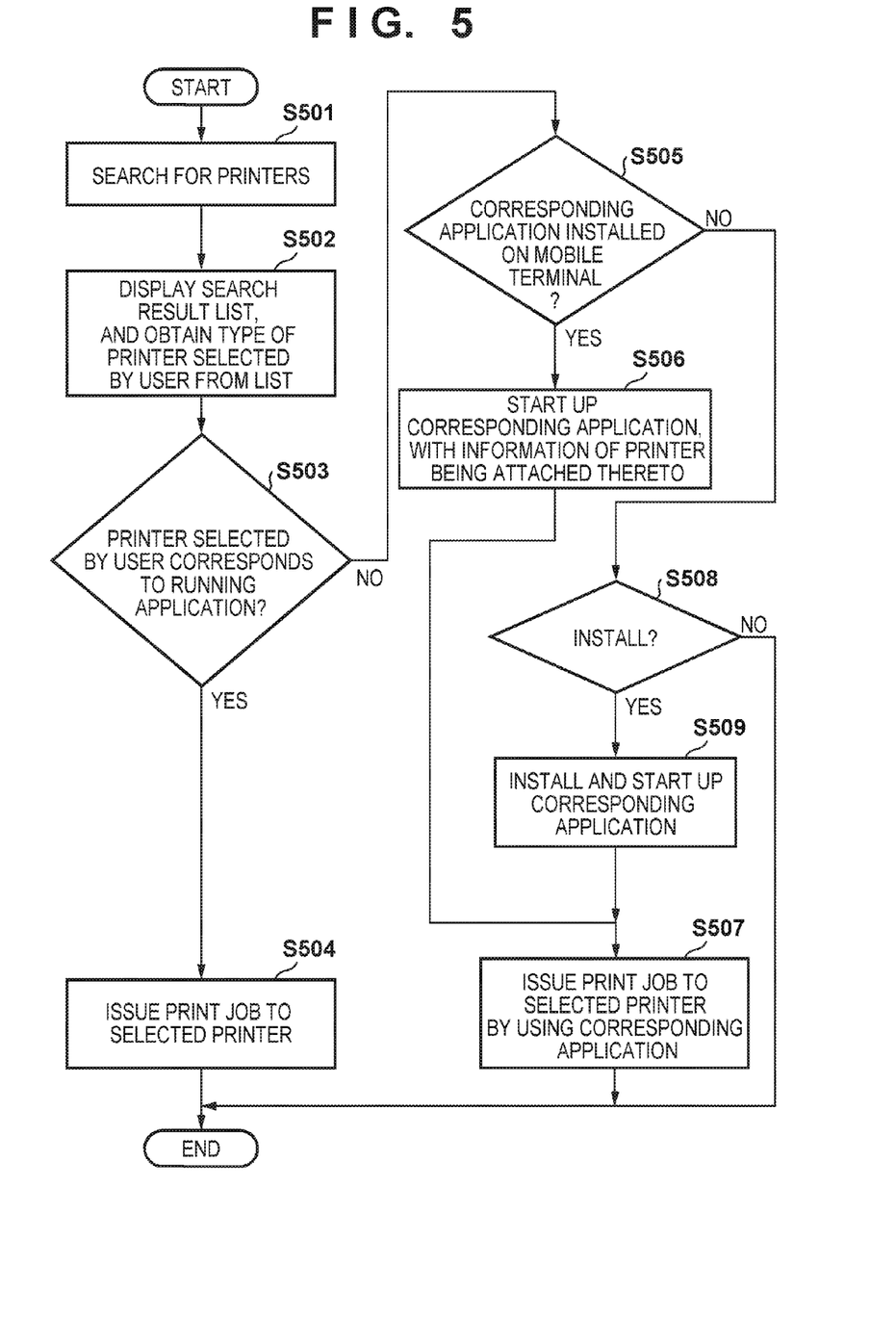
FIG. 5 is a flowchart for describing printer search processing performed by the mobile terminal according to the first embodiment.

FIG. 5 is a flowchart for describing printer search processing performed by the mobile terminal 100 according to the first embodiment. The steps in the flowchart shown in FIG. 5 are achieved by the CPU 201 deploying a control program that is stored in a memory such as the ROM 202 to the RAM 203, and executing the control program.

First, in step S501, the CPU 201 performs printer search processing according to an instruction from the user of the mobile terminal 100. Specifically, the CPU 201 transmits a printer search packet to the network via the wireless communication unit 209.

Figure 6A:
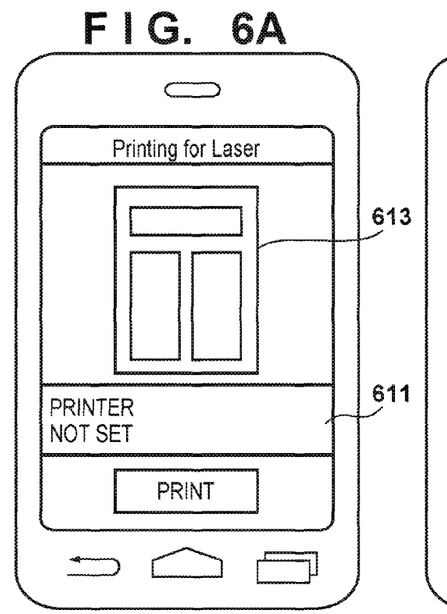
FIGS. 6A to 6D are diagrams each showing an example of an operation screen that is displayed by the mobile terminal according to the first embodiment.

FIG. 6A is a diagram showing an example of a preview screen that is displayed by the mobile terminal 100 according to the first embodiment.

The user presses a button 611 for selecting a printer, while viewing a document preview 613 that is stored in the mobile terminal 100. Consequently, the screen transitions to a setting screen as shown in FIG. 6B, which is a screen for setting a printer search method.

Figure 6B:
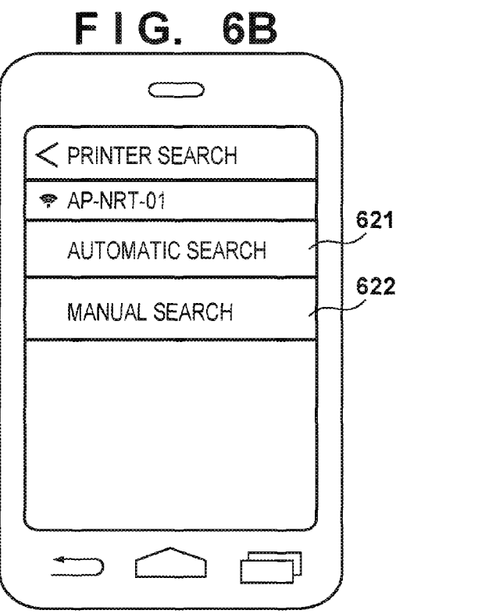

FIG. 6B is a diagram showing an example of a setting screen that is displayed by the mobile terminal 100 according to the first embodiment. The setting screen is for setting a printer search method. In this example, either an "AUTOMATIC SEARCH" 621 or a "MANUAL SEARCH" 622 can be selected as a search method.

Figure 6C:
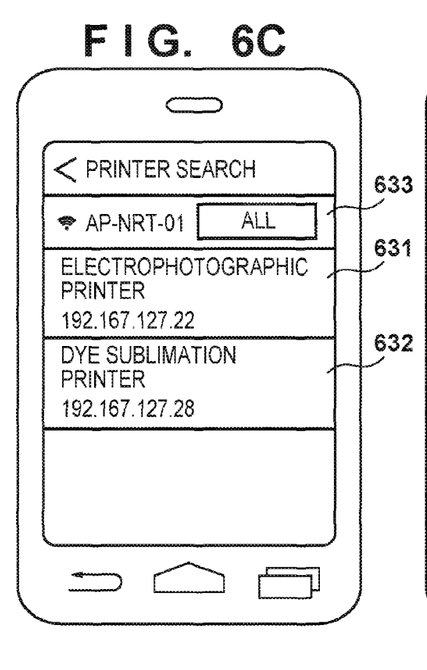

FIG. 6C is a diagram showing an example of displayed automatic search results in the case where the "AUTOMATIC SEARCH" 621 is selected on the screen shown in FIG. 6B. The mobile terminal 100 performs an automatic search, receives responses from the printers 110 and 120 in the network, and thus creates and displays a list of available printers as the automatic search results.

FIG. 6C shows, as the automatic search results, buttons 631 and 632 that respectively indicate two printers corresponding to the aforementioned printers 110 and 120. From this screen, the user selects a button corresponding to the printer that the user wishes to connect to, and the user can thus connect to the printer, and transmit print data to the printer to cause the printer to print the print data.

In FIG. 6C, if the user presses an "ALL" button 633, a menu screen for selecting "ALL", "ONLY ELECTROPHOTOGRAPHIC PRINTERS", or "ONLY DYE SUBLIMATION PRINTERS" is displayed (not shown in the drawings). On the menu screen, if the user selects "ONLY ELECTROPHOTOGRAPHIC PRINTERS", only the button 631 indicating the electrophotographic printer is displayed on the search result list, and if the user selects "ONLY DYE SUBLIMATION PRINTERS", only the button 632 indicating the dye sublimation printer is displayed. FIG. 6C corresponds to the case where "ALL" is selected on the menu screen.

Upon obtaining the printer search results in step S501, the CPU 201 proceeds the process to step S502, and displays, as shown in FIG. 6C for example, a search result list that is based on the printer search results. Then, the CPU 201 receives the result of selection of the printer that the user wishes to use, which is specified by the user from the search result list on the screen shown in FIG. 6C.

Next, the CPU 201 proceeds the process to step S503, and determines whether or not the printer selected by the user in step S502 can be used for printing by the print application that has performed the search. This determination is made by asking the printer about an MIB (Management Information Base) value via the network and making a determination based on the return value. Alternatively, the application may have a table (TABLE 1) that indicates the model name of the printer and whether the printer is an electrophotographic printer or a dye sublimation printer, and make a determination by asking the printer found by the search about the model name and referring to the model name and the table.

TABLE 1 is an example of a table in which the model names of printers and the printing methods of the printers are registered in association with each other.

TABLE 1

| Model Name Information | Printing Method |
| --- | --- |
| Printer-001 | Electrophotographic |
| Printer-002 | Electrophotographic |
| Printer-003 | Electrophotographic |
| Printer-004 | Electrophotographic |
| Printer-005 | Electrophotographic |
| Printer-006 | Dye Sublimation |
| Printer-007 | Dye Sublimation |
| Printer-008 | Dye Sublimation |
| Printer-009 | Dye Sublimation |

In step S503, the CPU 201 determines whether or not the running application can perform print processing by using the printer selected by the user. Upon determining that the application can perform print processing, the CPU 201 proceeds the process to step S504, and upon determining that the application cannot perform print processing, the CPU 201 proceeds to step S505. In step S504, the CPU 201 proceeds straight to print processing with the printer selected by the user because the running application can perform print processing by using the printer.

Figure 6D:
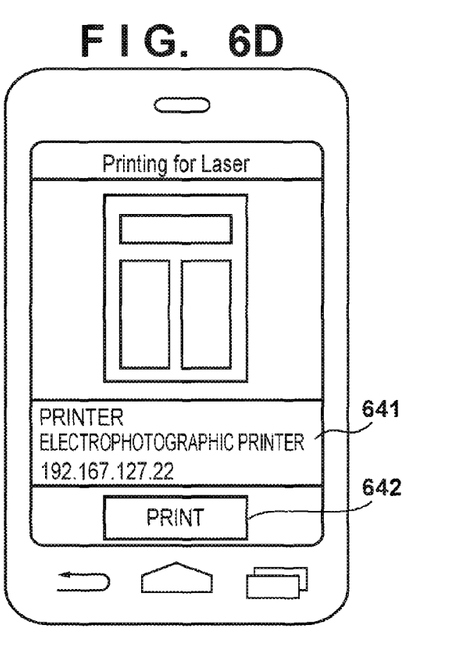

FIG. 6D shows the case where the user presses the button 631 for selecting the electrophotographic printer on the screen shown in FIG. 6C, and the electrophotographic printer 110 is selected as the printer to be used for printing as indicated by printer information 641. Then, if the user presses a "PRINT" button 642, a print instruction is transmitted from the mobile terminal 100 to the electrophotographic printer 110. The processing in step S504 is performed when the user presses the "PRINT" button 642.

Step S505 corresponds to the case where the application by which the printer search processing was performed does not match the printer type selected by the user. Specifically, step S505 corresponds to, for example, the case where the printer selected by the user is the dye sublimation printer 120 and the application running on the mobile terminal 100 is an application that uses the electrophotographic printer 110. If this is the case, in order to perform print processing from the mobile terminal 100 by using the dye sublimation printer 120 selected by the user, the dye sublimation printer application 301 is required.

Therefore, in step S505, the CPU 201 determines whether or not the application that corresponds to the selected printer has already been installed (implemented) to the mobile terminal 100. Upon determining that the application has been installed, the CPU 201 proceeds the process to step S506, and starts up the dye sublimation printer application 301, with the information of the printer selected by the user in step S502 and the preview 613 of the document information shown in FIG. 6A being attached thereto. The information of the printer includes the IP address of the printer, and if the connection is via Wi-Fi, the information includes the SSID, the password, etc., for Wi-Fi. Next, the CPU 201 proceeds the process to step S507 and issues a print job to the selected printer by using the application thus started up, and then ends the processing.

Figure 7A:
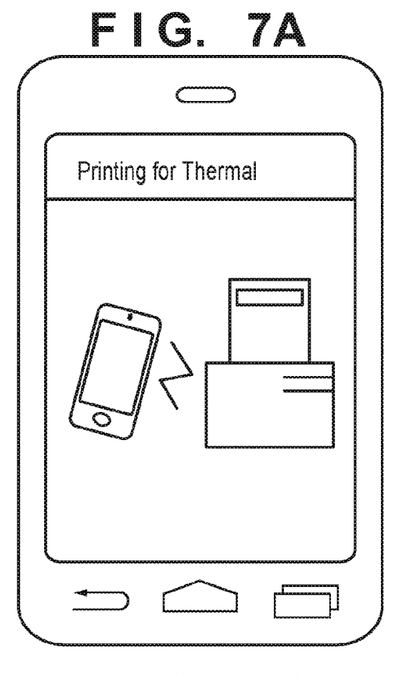
FIGS. 7A to 7C are diagrams each showing an example of the operation screen that is displayed by the mobile terminal according to the first embodiment.

FIG. 7A shows an example of an application start-up screen that is displayed when the dye sublimation printer application 301 is started up on the mobile terminal 100 according to the first embodiment.

The mobile terminal 100 issues a print instruction to the dye sublimation printer 120 based on the information of the printer and the document information. Note that when starting up the dye sublimation printer application 301 in step S506, the CPU 201 attaches thereto the information of the printer and the information of the document to be printed. However, when starting up the application, if it is impossible to attach such information to the application due to, for example, limitations of the OS 303, the CPU 201 may start up only the dye sublimation printer application 301.

Figure 7B:
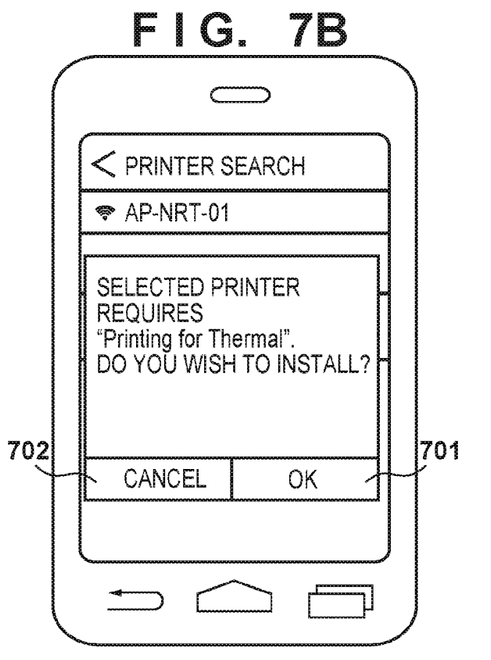

On the other hand, upon determining in step S505 that the application that corresponds to the selected printer has not been installed to the mobile terminal 100, the CPU 201 proceeds the process to step S508 and displays the screen shown in FIG. 7B.

FIG. 7B is a diagram showing an example of an installation confirmation screen that is displayed on the mobile terminal 100 according to the first embodiment.

This screen displays a message indicating that the dye sublimation printer application 301 for using the selected printer has not been installed, as well as asking the user whether or not to perform installation of the application 301. If the user touches an "OK" button 701, the CPU 201 proceeds the process to step S509, and if the user touches a "CANCEL" button 702, the CPU 201 ends the processing without executing the installation of the application, and the screen shown in FIG. 6A is displayed again. In step S509, the CPU 201 instructs the OS 303 to install the dye sublimation printer application 301. Consequently, the OS 303 displays the screen shown in FIG. 7C on the operation panel 205.

Figure 7C:
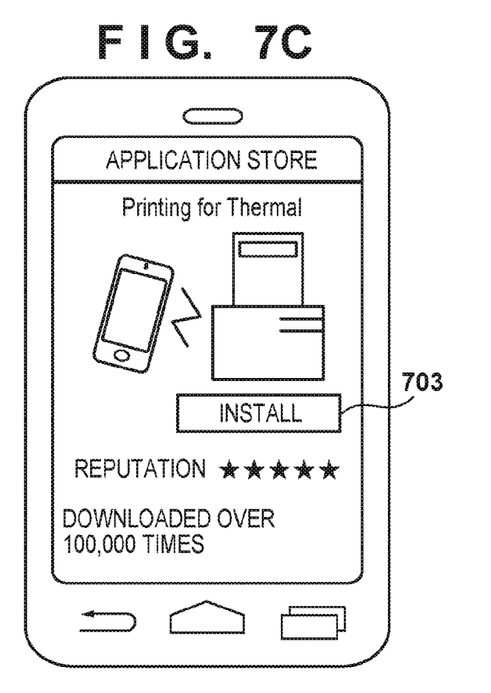

FIG. 7C is a diagram showing an example of a screen for making an instruction to download the dye sublimation printer application 301.

If the user presses an "INSTALL" button 703, the CPU 201 proceeds the process to step S509. In step S509, the CPU 201 accesses an application distribution server, which is not shown in the drawings, and downloads the dye sublimation printer application 301 from the application distribution server and installs it. Then, the CPU 201 starts up the installed application and proceeds the process to step S507. The user of the mobile terminal 100 can thus easily obtain the dye sublimation printer application 301 that corresponds to the selected printer and perform print processing by using the selected printer.

Regarding step S508 and step S509 shown in FIG. 5, a description has been given of a configuration with which the dye sublimation printer application 301 is downloaded from the application distribution server upon confirmation by the user. However, another mode may be adopted. For example, the mobile terminal 100 may download and install the dye sublimation printer application 301 by automatically accessing the application distribution server without confirmation by the user.

Alternatively, the mobile terminal 100 may end the processing after only prompting the user to install the dye sublimation printer application 301. If this is the case, the user manually accesses the application distribution server, and manually downloads and installs the dye sublimation printer application 301.

Alternatively, it is acceptable that the mobile terminal 100 automatically accesses the application distribution server, and then the user manually downloads and installs the dye sublimation printer application 301.

In the first embodiment, a description has been given of an example of the case of searching for dye sublimation printers in a situation where the electrophotographic printer application 302 has been installed. However, electrophotographic printers can be searched for in the same manner in a situation where the dye sublimation printer application 301 has been installed.

In the first embodiment, printers are searched for from the preview screen shown in FIG. 6A. In addition, in some cases, the original document shown on the preview screen may be provided by an application other than the dye sublimation printer application 301 or the electrophotographic printer application 302, using Open-In, which is an application interaction function. In such cases, the dye sublimation printer application 301 or the electrophotographic printer application 302 can be started up by Open-In and display a preview screen that is similar to the screen shown in FIG. 6A. Printing can then be performed by starting up the application that corresponds to the selected printer according to the flowchart shown in FIG. 5.

Figure 8:
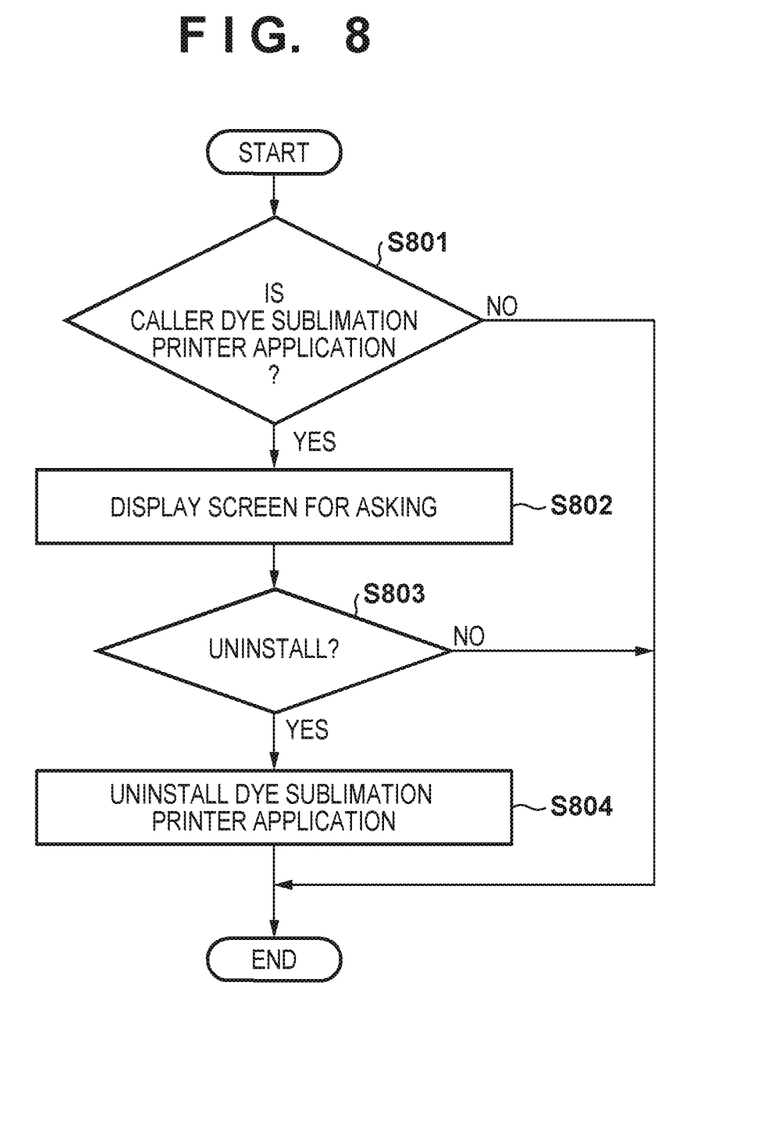
FIG. 8 is a flowchart for describing processing for uninstalling a dye sublimation printer application, which is performed on the mobile terminal according to the first embodiment when an electrophotographic printer application is started up.

FIG. 8 is a flowchart for describing processing for uninstalling the dye sublimation printer application 301, which is performed on the mobile terminal 100 according to the first embodiment when the electrophotographic printer application 302 is started up. Note that the steps in the flowchart shown in FIG. 8 are achieved by the CPU 201 deploying a control program stored in a memory such as the ROM 202 to the RAM 203 and executing the control program.

First, in step S801, the CPU 201 determines whether or not a caller application is the dye sublimation printer application 301. If the caller application is the dye sublimation printer application 301, the CPU 201 proceeds the process to step S802. Otherwise, the CPU 201 ends this processing and continues the normal start-up processing because uninstallation is unnecessary. In step S802, the CPU 201 displays, on the operation panel 205, a screen (not shown in the drawings) for asking the user whether or not to uninstall the dye sublimation printer application 301, which is the caller, and waits for a user operation. If the user makes an instruction to uninstall the application, the CPU 201 proceeds the process to step S803. If the user does not make an instruction to uninstall the application, the CPU 201 ends this processing and continues the normal start-up processing. In step S803, the CPU 201 performs uninstallation of the dye sublimation printer application 301, and continues the normal start-up processing.

According to the processing shown in FIG. 8, the user can uninstall the dye sublimation printer application 301 that corresponds to the dye sublimation printer 120 that is not to be used for printing, and therefore the user can avoid mistakenly starting up an application that does not correspond to the printer to be used.

Although the flowchart shown in FIG. 8 describes an example of the case where the electrophotographic printer application 302 is started up, the flowchart is also applicable to the case of uninstalling the electrophotographic printer application 302 when the dye sublimation printer application 301 is started up.

In step S501 in the flowchart shown in FIG. 5, a single search module is used for searching for printers with reference to TABLE 1. Alternatively, a search module for dye sublimation printers and a search module for electrophotographic printers may be individually executed in step S501, and search results returned by the individual search modules may be combined and thus the search results shown in FIG. 6C, for example, may be displayed. The plurality of search modules may be executed in parallel or in sequence.

A description has been given of an example of the case of selecting a printer to be used for printing from the search result list shown in FIG. 6C. However, a list of selectable printers may be obtained and displayed by each of the dye sublimation printer application 301 and the electrophotographic printer application 302, and step S502 and the subsequent steps shown in FIG. 5 may be performed in response to the user selecting a desired printer from the lists of printers.

As described above, according to the first embodiment, even if an application that can use a printer selected by a user has not been installed to the mobile terminal, the application can be installed with a simple operation, and the user can use the desired printer.

Second Embodiment

Next, a description is given of a second embodiment. As shown in FIG. 6C for example, the first embodiment above provides a description of an example of the case of searching for a printer by using an automatic search and switching to the application that corresponds to the printing method of the printer. In contrast, the second embodiment provides a description of an example of the case of determining the printing method of a printer based on the information in the NFC tag and switching to the application that corresponds to the printer. Note that the system configuration, the configuration of the mobile terminal 100, and so on according to the second embodiment are the same as the above-described first embodiment, and therefore the description thereof is omitted.

Figure 9:
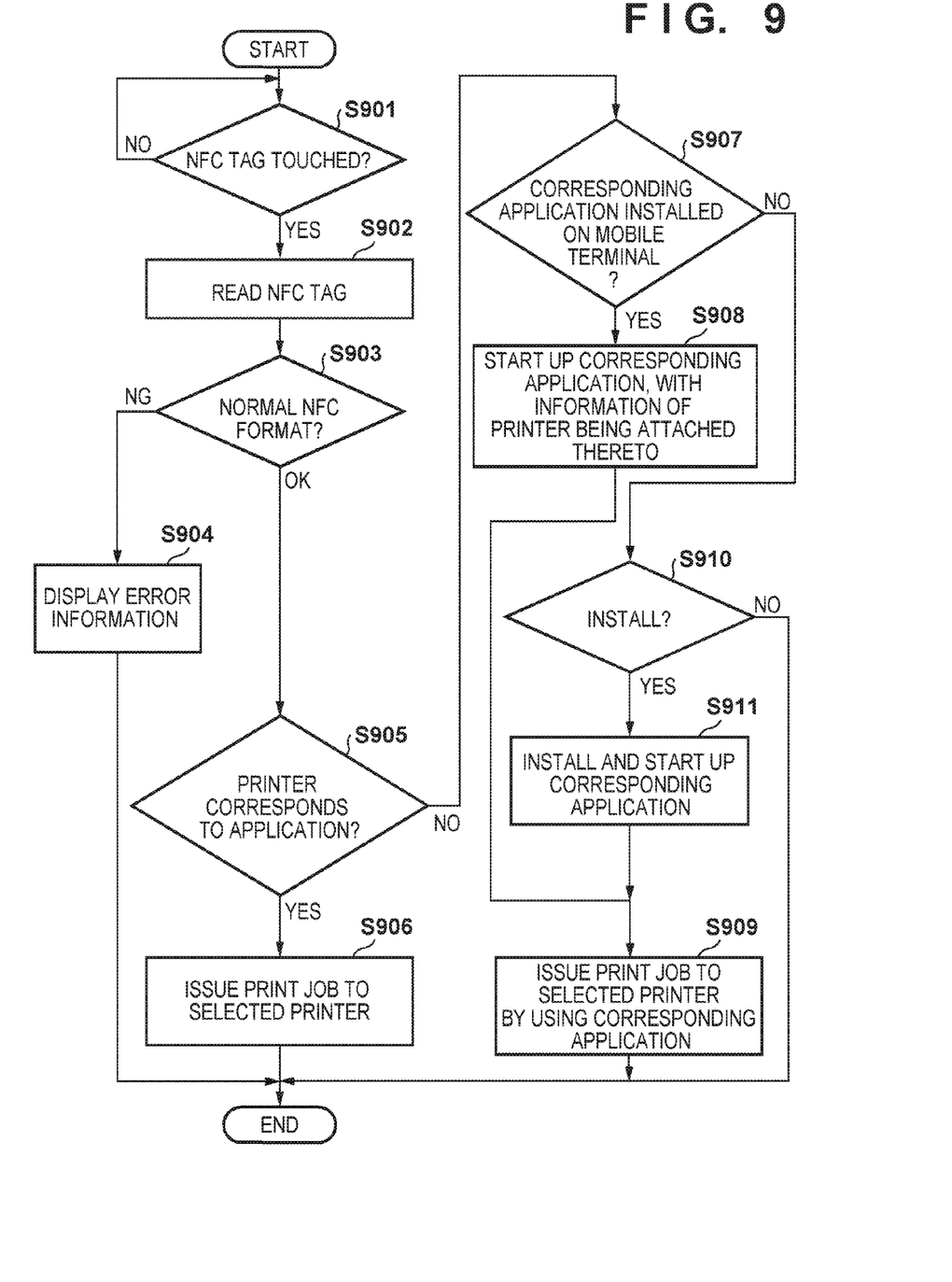
FIG. 9 is a flowchart for describing printer search processing performed by a mobile terminal according to a second embodiment.

FIG. 9 is a flowchart for describing print processing with a printer, performed by the mobile terminal 100 according to the second embodiment. Here, a description is given of print processing that is performed by the mobile terminal 100 executing the electrophotographic printer application 302, and the mobile terminal 100 reading the NFC tag 111 of the electrophotographic printer 110. Note that the steps in the flowchart shown in FIG. 9 are achieved by the CPU 201 deploying a control program stored in a memory such as the ROM 202 to the RAM 203 and executing the control program.

First, in step S901, using the near field wireless communication unit 208, the CPU 201 determines whether or not a user of the mobile terminal 100 has touched the NFC tag 111 of the electrophotographic printer 110. Upon determining that the user has touched the NFC tag 111, the CPU 201 proceeds the process to step S902, and reads the data recorded in the NFC tag 111 thus touched, by using the near field wireless communication unit 208. The CPU 201 then proceeds the process to step S903 to check the format of the data read in step S902, and proceeds the process to step S904 upon determining that the data is incorrect, or the format is not normal due to a failure in reading. In step S904, the CPU 201 displays information about the error (not shown in the drawings) on the operation panel 205, and ends this processing.

Upon determining in step S903 that reading of the NFC tag 111 has completed normally and the format is normal, the CPU 201 proceeds the process to step S905 and determines whether or not the running application corresponds to the information of the printer stored in the NFC tag 111 thus read.

TABLE 2 shows an example of the tag information of the NFC tag 111 mounted on the electrophotographic printer 110.

TABLE 2

| NFC Tag Information | Value |
| --- | --- |
| 1. Printer type information | Laser |
| 2. Start-up application information | com.example.laser-app |
| 3. Wi-Fi connection information | SSID: AP-NRT-01 |
| | Password: abcdefg |
| 4. Network connection information | MAC: 1c-3e-fc-4e-45-db |
| 5. Printer name | Electrophotographic printer |
| 6. Model name | Printer-001 |

The printer type information indicates the type of the printer. In TABLE 2, "laser" indicates the electrophotographic printer 110. Note that the printer type information in the case of a dye sublimation printer indicates "thermal". The start-up application information indicates the name of the application that is started up when the NFC tag 111 is touched with the mobile terminal 100. In TABLE 2, the start-up application information indicates an NFC interactive print application that is named "com.example.laser-app" for an electrophotographic printer. The Wi-Fi information includes the SSID and the password information of the access point 130 via which the mobile terminal 100 can access the electrophotographic printer 110. The network connection information indicates the MAC address of the electrophotographic printer 110. Although only the MAC address is shown in TABLE 2, the network connection information may be a combination of pieces of information that can identify the electrophotographic printer 110, such as the IP address and the UUID. The printer name is the name of the electrophotographic printer 110 mounted with the NFC tag 111. In this example, "Electrophotographic Printer" corresponding to the electrophotographic printer 110 is stored. The model name indicates the model name "Printer-001" of the electrophotographic printer 110.

In step S905, the CPU 201 checks the printer type information, which is at the top of the information of the NFC tag 111. If the information indicates "laser", the CPU 201 determines that the printing method corresponds to the current application, and proceeds the process to step S906. If the information indicates a printer type other than "laser", the CPU 201 proceeds the process to step S907. In step S905, the CPU 201 uses the printer type information at the top of the information of the NFC tag 111 to determine whether or not the printer corresponds to the application. Alternatively, however, the CPU 201 may make a determination with reference to the printer name, the model name and the TABLE 1, and so on. Also, in step S905, the CPU 201 may make a determination by specifying the printing method from the start-up application information. The subsequent processing performed in step S905 to step S911 is the same as the processing performed in step S503 to step S509 shown in FIG. 5 described above, and therefore the description thereof is omitted.

As described above, according to the second embodiment, it is possible to select a printer by touching the NFC tag of the desired printer with the mobile terminal 100. If an application that corresponds to the selected printer has not been installed to the mobile terminal, an application that corresponds to the selected printer is installed so that printing can be performed.

Although the NFC tags 111 and 121 in the first embodiment and the second embodiment are of a tag-type, they may be NFC tag controllers that are connected to the printer via a wire.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD™), a flash memory device, a memory card, and the like).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-056863, filed Mar. 19, 2015 which is hereby incorporated by reference herein in its entirety.

What is claimed is:

1. A method of controlling an information processing apparatus, the method comprising:
   searching for printers;
   displaying results of the searching;
   if a printer selected by a user from the results of the searching does not correspond to a print application that has performed the search, determining whether or not another print application corresponding to the printer selected by the user has been installed to the information processing apparatus;
   prompting the user to install the another print application to the information processing apparatus if it is determined that the another print application has not been installed to the information processing apparatus; and
   starting up the another print application in the information processing apparatus, if it is determined that the another print application has been installed to the information processing apparatus.

2. The method according to claim 1,
   wherein the prompting includes accessing a distribution server that is configured to distribute the another print application.

3. The method according to claim 1,
wherein the prompting includes:
asking the user whether or not to install the another print application to the information processing apparatus; and
accessing a distribution server that is configured to distribute the another print application if the user makes an instruction to install the another print application to the information processing apparatus in response to being asked.

4. The method according to claim 1, further comprising:
transmitting a print job to the printer selected by the user if the printer selected by the user corresponds to the print application that has performed the search.

5. An information processing apparatus, the apparatus comprising:
a memory device that stores a set of instructions;
at least one processor that executes the instructions to:
search for printers;
display results of the search;
determine, if a printer selected by a user from the results of the search does not correspond to a print application that has performed the search, whether or not another print application corresponding to the printer selected by the user has been installed to the information processing apparatus;
prompt the user to install the another print application to the information processing apparatus if it is determined that the another print application has not been installed to the information processing apparatus; and
start up the another print application in the information processing apparatus if it is determined that the another print application has been installed to the information processing apparatus.

6. A non-transitory computer-readable storage medium storing a program for causing a processor to execute a method of controlling an information processing apparatus, the method comprising:
searching for printers;
displaying results of the searching;
if a printer selected by a user from the results of the searching does not correspond to a print application that has performed the search, determining whether or not another print application corresponding to the printer selected by the user has been installed to the information processing apparatus;
prompting the user to install the another print application to the information processing apparatus if it is determined that the another print application has not been installed to the information processing apparatus; and
starting up the another print application in the information processing apparatus, if it is determined that the another print application has been installed to the information processing apparatus.

7. A method of controlling an information processing apparatus, the method comprising:
searching for printers;
displaying results of the searching;
determining whether or not a print application corresponding to a printer selected by a user from the results of the searching has been installed in the information processing apparatus;
prompting the user to install the print application to the information processing apparatus if it is determined that the print application has not been installed to the information processing apparatus; and
start up the print application in the information processing apparatus if it is determined that the print application has been installed to the information processing apparatus.

8. The method according to claim 7,
wherein the prompting includes accessing a distribution server that is configured to distribute the print application.

9. The method according to claim 7,
wherein the prompting includes:
asking the user whether or not to install the print application to the information processing apparatus; and
accessing a distribution server that is configured to distribute the print application if the user makes an instruction to install the print application to the information processing apparatus in response to being asked.

10. An information processing apparatus comprising:
a memory device that stores a set of instructions;
at least one processor that executes the instructions to:
search for printers;
display results of the search;
determine whether or not a print application corresponding to a printer selected by a user from the results of the searching has been installed in the information processing apparatus;
prompt the user to install the print application to the information processing apparatus if it is determined that the print application has not been installed to the information processing apparatus; and
start-up the print application in the information processing apparatus if it is determined that the print application has been installed to the information processing apparatus.

11. A non-transitory computer-readable storage medium storing a program for causing a processor to execute a method of controlling an information processing apparatus, the method comprising:
searching for printers;
displaying results of the searching;
determining whether or not a print application corresponding to a printer selected by a user from the results of the searching has been installed in the information processing apparatus;
prompting the user to install the print application to the information processing apparatus if it is determined that the print application has not been installed to the information processing apparatus; and
start up the print application in the information processing apparatus if it is determined that the print application has been installed to the information processing apparatus.

* * * * *